(12) United States Patent (10) Patent No.: US 8,736,451 B2
Wieth et al. (45) Date of Patent: May 27, 2014

(54) THEFT PROTECTION FOR SELF-SERVICE STORES

(76) Inventors: Franz Wieth, Puchheim (DE); Horst Sonnendorfer, Puchheim (DE)

( * ) Notice: Subject to any disclaimer, the term of this patent is extended or adjusted under 35 U.S.C. 154(b) by 164 days.

(21) Appl. No.: 13/146,692

(22) PCT Filed: Feb. 2, 2010

(86) PCT No.: PCT/DE2010/000108
§ 371 (c)(1),
(2), (4) Date: Jul. 28, 2011

(87) PCT Pub. No.: WO2010/099771
PCT Pub. Date: Sep. 10, 2010

(65) Prior Publication Data
US 2011/0279272 A1 Nov. 17, 2011

(30) Foreign Application Priority Data
Feb. 2, 2009 (DE) ...................... 20 2009 001 237 U

(51) Int. Cl.
*G08B 13/14* (2006.01)
(52) U.S. Cl.
USPC ...................... 340/568.5; 340/572.1; 340/619
(58) Field of Classification Search
USPC ................. 340/568.5, 568.1, 571, 572.1, 619
See application file for complete search history.

(56) References Cited

U.S. PATENT DOCUMENTS

| 5,083,638 | A | * | 1/1992 | Schneider | 186/61 |
| 5,662,190 | A | * | 9/1997 | Abe | 186/61 |
| 5,900,614 | A | * | 5/1999 | Nakakawaji et al. | 235/462.14 |
| 6,105,866 | A | * | 8/2000 | Morrison et al. | 235/383 |
| 6,167,381 | A | * | 12/2000 | Swaine et al. | 705/17 |
| 7,416,117 | B1 | * | 8/2008 | Morrison | 235/383 |
| 2003/0184440 | A1 | * | 10/2003 | Ballantyne | 340/568.5 |
| 2008/0005036 | A1 | * | 1/2008 | Morris | 705/64 |

FOREIGN PATENT DOCUMENTS

EP 1 014 319 A2 6/2000

OTHER PUBLICATIONS

International Search Report of PCT/DE2010/000108, Dated Sep. 9, 2010.

* cited by examiner

*Primary Examiner* — Daniel Previl
(74) *Attorney, Agent, or Firm* — Laurence A. Greenberg; Werner H. Stemer; Ralph E. Locher

(57) ABSTRACT

In order to detect attempted theft, the time that a shopping cart remains in a self-scanning zone in a self-checkout line is monitored. If a certain duration is not met between the time at which the region of the self-scanning register is entered and the exit is passed, an alarm is triggered.

4 Claims, 1 Drawing Sheet

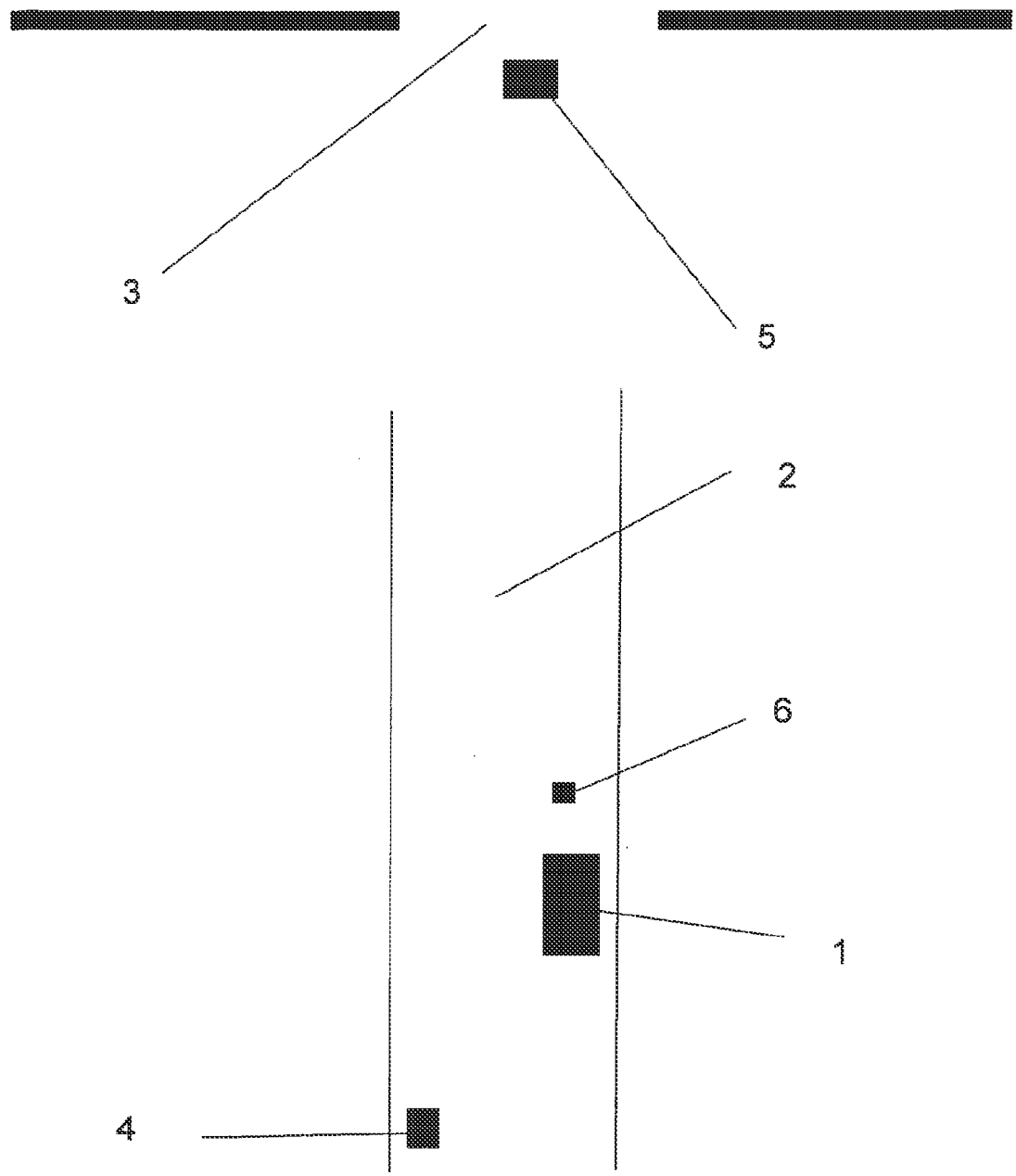

THEFT PROTECTION FOR SELF-SERVICE STORES

TECHNICAL FIELD

The invention relates to the theft protection for self-service stores comprising so-called self-scanning registers, in the case of which the customers themselves present the purchased goods at an automated register. There, the goods are identified and calculated by means of the commodity code (e.g. EAN code as bar code). Subsequently, the customer pays for the identified goods and can leave the self-service store.

STATE OF THE ART

In the case of known systems for theft protection, the goods presented to the automatic register by the customer are weighed and a plausibility between the weight of a product stored in a database and the actually weighed weight is established.

In so doing, it can be detected when manipulations were made, for instance when the bar code of a cheap product was adhered to an expensive product. In such a case, an alarm can then be triggered, which leads to the inspection of the customer at the exit.

The high technical effort, which is necessary in the case of the state of the art, is disadvantageous, because a highly-accurate scale must be available at every self-scanning register and a connection between the self-scanning register and the alarm system must be available.

In addition, this system is also not tamper-proof, because a number of goods exist, in the case of which the weight is the same, but the price is considerably different. Such a group of goods are alcoholic beverages comprising a standardized content in the same bottles, for example. The quality and price differences between a bottle of sparkling wine and a bottle of champagne cannot be detected by means of the weight with the known system.

The high technical effort thus has a disadvantageously long amortization time.

A further disadvantage of the known self-scanning registers is that it is possible to pass the self-scanning register with the shopping cart, without presenting any goods.

DISCLOSURE OF THE INVENTION

Technical Object

It is the object of the invention to create a device for detecting manipulations at a self-scanning register, which is inexpensive and which additionally detects when a self-scanning register is passed, without presenting the goods.

Technical Solution

This object is solved in that it is determined how long a customer has remained in the area self-scanning register with his shopping cart before he leaves the self-service store.

The invention embraces the knowledge that considerably more time is required when the customer presents the goods at the self-scanning register and pays than when the customer passes the self-scanning register and walks to the exit without scanning.

In the event that a certain time between entering the area of the self-scanning register and passing the exit has not been met, an alarm is triggered.

Advantageous Effects

A cost-efficient device for detecting theft at a self-scanning register, which gets by without a highly accurate scale and which does not require a connection to the self-scanning register, is created by means of the instant invention in an advantageous manner.

This allows in an advantageous manner to operate the invention as a stand-alone device, which can be retrofitted at any time. Due to the comparatively low costs, the amortization is possible within a relatively short time.

BRIEF DESCRIPTION OF THE DRAWINGS

The invention will be explained below by means of a FIGURE.

FIG. 1 shows a layout of a self-service store comprising a self-scanning register 1. The self-scanning register 1 is located in an aisle 2. The aisle is followed by the exit 3 of the self-service store.

A sensor 4, by means of which each shopping cart, which is pushed into the aisle 2, is detected individually, is located in the entrance area of the aisle 2.

The individual detection of the shopping cart is carried out either in that a marking is located on the shopping cart, which can be detected in an optical or electronic manner. Such a marking can be a bar code on the shopping cart, for example, or a transponder, which is attached to the shopping cart. It is also possible to indirectly detect the presence of a shopping cart via a customer card when the person, who uses the shopping cart, carries such a card. Such a customer card can be detected most easily when the customer card contains a transponder.

An individual detection of the shopping cart in the above-mentioned manner is carried out once again by means of a further sensor 5, which is located at the aisle 2 comprising the self-scanning register 1.

Conclusions can be drawn to an attempted theft by means of the time period between the detection at the sensor 4 at the entrance area of the aisle 2 comprising the self-scanning register 1 and the capturing at the sensor 5 after the self-scanning register 1.

A short time period suggests that the user of the shopping cart has passed the aisle 2 comprising the self-scanning register 1 without presenting the goods at the self-scanning register 1 and now attempts to leave the self-service store through the exit 3 without paying.

An alarm is then triggered and security personnel can subject the cart to an individual inspection.

For reasons of discretion, it is possible hereby that a silent alarm is triggered. The silent alarm has the advantage that potential offenders, who notice an inspection of another customer, initially do not obtain any information that a technical device is present. Instead, a potential offender might possibly assume that the inspections are carried out randomly and will thus not worry about developing an avoidance strategy.

In a further development of the invention, a sensor 6 captures the proximity around the self-scanning register 1. This sensor 6 captures the shopping cart or the customer card of the person, who uses the shopping cart, at regular time intervals, which can be adjusted to the application.

In the case of a proper behavior of a person, the sensor 6 will capture the shopping cart several times in the time period, during which the goods are presented to the self-scanning register 1.

If, after the self-scanning register 1, the sensor 5 captures a shopping cart, which has not been detected previously by the sensor 6 several times in the proximity around the self-scanning register 1, this is an indication that an attempt is made to transport the goods out of the self-service store without paying.

By means of this further development, it is made more difficult for offenders to deceive the device, in that they intentionally take a long time to pass the aisle 2 comprising the self-scanning register 1, so as to thus let a time period lapse, which seems to be plausibly long.

The invention can be used commercially in all self-service stores comprising self-scanning registers.

The invention claimed is:

1. A theft protection system for stores with self-scanning registers for self-checkout, the system comprising:
   a first sensor disposed to individually capture a given shopping cart in front of the self-scanning register along a direction of a self-checkout line; and
   a second sensor disposed to individually capture the given shopping cart behind the self-scanning register; and
   wherein the system is configured to trigger an alarm if a predetermined period of time has not elapsed between a detection of the given shopping cart by said first sensor and a detection of the given shopping cart by said second sensor.

2. The theft protection system according to claim 1, further comprising a respective identifier for individually identifying each given cart.

3. A theft protection system for self-service stores with self-scanning registers for self-checkout, the system comprising:
   a first sensor disposed to capture at regular intervals a proximity around the self-scanning register for a presence of shopping carts;
   a second sensor disposed to individually capture a given shopping cart again after the self-scanning register, along a checkout direction; and
   wherein an alarm is triggered if a given shopping cart is detected by said second sensor which was not captured by said first sensor in the proximity around the self-scanning register or the given shopping cart was captured only for an insufficiently long period of time.

4. The theft protection system according to claim 3, further comprising a respective identifier for individually identifying each given cart.

\* \* \* \* \*